US009602389B1

(12) United States Patent
Maveli et al.

(10) Patent No.: US 9,602,389 B1
(45) Date of Patent: Mar. 21, 2017

(54) METHOD AND SYSTEM FOR DEFINING LOGICAL CHANNELS AND CHANNEL POLICIES IN AN APPLICATION ACCELERATION ENVIRONMENT

(71) Applicants: Naveen Maveli, Pleasanton, CA (US); Alex Kaufman, San Bruno, CA (US); Ashwath Nagaraj, Los Altos Hills, CA (US); Peter Yu, Fremont, CA (US)

(72) Inventors: Naveen Maveli, Pleasanton, CA (US); Alex Kaufman, San Bruno, CA (US); Ashwath Nagaraj, Los Altos Hills, CA (US); Peter Yu, Fremont, CA (US)

( * ) Notice: Subject to any disclaimer, the term of this patent is extended or adjusted under 35 U.S.C. 154(b) by 0 days.

(21) Appl. No.: 14/948,253

(22) Filed: Nov. 21, 2015

(51) Int. Cl.
*H04L 12/911* (2013.01)
*H04L 12/727* (2013.01)
*H04L 29/06* (2006.01)
*H04L 12/803* (2013.01)

(52) U.S. Cl.
CPC .......... *H04L 45/121* (2013.01); *H04L 47/125* (2013.01); *H04L 69/22* (2013.01)

(58) Field of Classification Search
CPC ............. H04L 12/4633; H04L 63/0272; H04L 63/029; H04L 67/10
See application file for complete search history.

(56) References Cited

U.S. PATENT DOCUMENTS

| 2005/0058149 A1* | 3/2005 | Howe | H04L 47/10 370/428 |
| 2009/0046583 A1* | 2/2009 | Towster | H04L 41/0896 370/232 |
| 2011/0016180 A1* | 1/2011 | Bharadhwaj | G06Q 10/10 709/205 |
| 2011/0149826 A1* | 6/2011 | Choi | H04N 21/4622 370/312 |
| 2012/0155460 A1* | 6/2012 | Gu | H04W 28/06 370/389 |
| 2012/0179796 A1* | 7/2012 | Nagaraj | H04L 45/22 709/223 |

* cited by examiner

*Primary Examiner* — Khaled Kassim
*Assistant Examiner* — Zhaohui Yang
(74) *Attorney, Agent, or Firm* — Raj Abhyanker, P.C.

(57) ABSTRACT

Disclosed are a method and/or a system for defining logical channels and channel policies in an application acceleration environment. In one aspect, a system includes a branch site including a branch client. A headquarters site includes a headquarters server, the branch site and the headquarters site are communicatively coupled over a logical link via a transmission media. A first point of presence (POP) is communicatively coupled with a branch customer premise equipment (CPE) located at the branch site over a first segment of the logical link. A second POP is communicatively coupled with the first POP over a second segment of the logical link. Each segment of the logical link is constructed from a physical link and contains two segment endpoints. The physical link carries a network traffic of the network connection between the two segment endpoints of an associated segment.

23 Claims, 7 Drawing Sheets

FLOW DIAGRAM 450

METHOD AND SYSTEM FOR DEFINING LOGICAL CHANNELS AND CHANNEL POLICIES IN AN APPLICATION ACCELERATION ENVIRONMENT

FIELD OF THE TECHNOLOGY

This disclosure relates generally to computer networking and, more particularly, to a method and a system for defining logical channels and channel policies in an application acceleration environment.

BACKGROUND

Defining logical channels and channel policies in an application acceleration environment may be challenging. For example, a network may be heterogeneous with many constituent parts. Performance of the application may be a factor of bandwidth and latency of the network. Speed of data transfer between a source point and a destination point on Internet may be limited by a number of factors (e.g., congestion, distance, size of link). The network of service providers and the physical links connecting a source point and a destination point may not be optimized to handle the bottleneck in speed of data transfer. As a result, the data transfer between the headquarters and the branch offices may incur a large delay (e.g., approximately 250 ms for a file transfer between US and India), a reduction in quality of the transferred data, or a loss of data packets during transfer.

SUMMARY

Disclosed are a method and/or a system for defining logical channels and channel policies in an application acceleration environment.

In one aspect, a system includes a branch site including a branch client. A headquarters site includes a headquarters server. The branch site and the headquarters site are communicatively coupled over a logical link via a transmission media. The logical link is identified through a logical link identifier. The branch client and the headquarters server are communicatively coupled over a network connection via the transmission media. The network connection is identified through a connection identifier.

A first point of presence (POP) is communicatively coupled with a branch customer premise equipment (CPE) located at the branch site over a first segment of the logical link. A second POP is communicatively coupled with the first POP over a second segment of the logical link. The second POP is communicatively coupled with a headquarters CPE located at the headquarters site over a third segment of the logical link. Each segment of the logical link is constructed from a physical link and contains two segment endpoints. The physical link carries a network traffic of the network connection between the two segment endpoints of an associated segment.

Each POP is capable of selecting a delivery optimization operation to perform on a packet of the network connection. The network connection is based on a POP identifier, the logical link identifier, and the connection identifier. The packet encodes the logical link identifier and the connection identifier. In addition, each POP of the system is capable of performing the delivery optimization operation on the packet based on that identification.

Each CPE and each POP is capable of defining a logical channel to transmit the packet over the physical link. Further, each CPE and POP of the system is capable of defining a policy of the logical channel. The policy is a path selection policy, a load balancing policy, a replication policy, and/or a timed replay policy. The path selection policy selects a particular physical link to transmit the packet from a first segment endpoint of the associated segment of the logical link to an associated POP and/or an associated CPE located at a second segment endpoint of the associated segment over the associated segment of the logical link based on a preferred path associated with the logical channel. The load balancing policy selects the particular physical link to transmit the packet from a first segment endpoint of the associated segment of the logical link to an associated POP and/or an associated CPE located at a second segment endpoint of the associated segment over the associated segment of the logical link based on a round robin algorithm.

The replication policy selects at least two physical links over which to simultaneously transmit the packet and the copy of the packet over the associated segment of the logical link. The timed replay policy selects the physical link over which to transmit the packet and schedule a transmission of the copy of the packet within a predefined time of transmitting the packet over the physical link. Each CPE and POP is capable of transmitting the packet over the associated segment of the logical link using a defined policy of the logical channel.

The packet is securely transmitted between the branch site and the headquarters site over each segment of the logical link through a network tunnel. The network tunnel is generated using a tunneling protocol capable of encapsulating a payload protocol by a network protocol across an intervening firewall. Each POP is located such that an application acceleration and a network optimization in the transmission of the packet are dispersed across the system, without being concentrated at the end points thereof.

The packet to be transmitted may be encapsulated with a channel header. The channel header may contain a channel identifier, a channel sequence number of the packet, and/or a fragment identifier. The logical channel may be encapsulated as a User Datagram Protocol (UDP) frame. The UDP frame may be used by the first POP, the second POP, the branch CPE, and/or the headquarters CPE receiving the packet to identify the particular physical link on which the packet was transmitted.

Each CPE and each POP of the system may be further capable of receiving the packet. In addition, each CPE and each POP may be capable of extracting the channel header from the packet. Furthermore, each CPE and each POP may be capable of performing a packet loss recovery, a packet reordering, a TX-packing and/or a packet fragment coalescence based on an information defined by the channel header.

The first POP and/or the second POP may further match an information defined by the channel header against a list of channel selectors to select a particular logical channel over which to transmit a packet. A channel selector may be a source subnet, a destination subnet, a Quality of Service (QoS) marking, a protocol, a source port, and/or a destination port.

Each CPE and each POP may be further capable of defining a virtual maximum transmission unit (MTU) associated with the logical channel. The virtual MTU may be higher than a physical MTU associated with the physical link enabling transmission of the packet when the packet is larger than the physical MTU. The defined policy may be the timed replay policy and the path selection policy, the load balancing policy, and/or the replication policy. The defined policy may differ in the two segments of the logical link.

Each CPE and each POP may be further capable of defining a QoS associated with the logical channel.

Each CPE and each POP may be further capable of identifying a channel metric and/or a physical link metric. The channel metric may be a channel loss, a channel round-trip time (RTT), a channel jitter, and/or a channel reorder. The physical link metric may be a physical link loss, a physical link RTT, a physical link jitter, and/or a physical link reorder. Each CPE and each POP may be capable of adjusting a policy behavior associated with the defined policy based on an identified metric.

In another aspect, a system includes a branch site including a branch client. A headquarters site includes a headquarters server. The branch site and the headquarters site are communicatively coupled over a logical link via a transmission media. The logical link is identified through a logical link identifier. The branch client and the headquarters server are communicatively coupled over a network connection via the transmission media. The network connection is identified through a connection identifier.

A first point of presence (POP) is communicatively coupled with a branch customer premise equipment (CPE) located at the branch site over a first segment of the logical link. A second POP is communicatively coupled with the first POP over a second segment of the logical link. In addition, the second POP is communicatively coupled with a headquarters CPE located at the headquarters site over a third segment of the logical link. Each segment of the logical link is constructed from a physical link and contains two segment endpoints.

The physical link carries a network traffic of the network connection between the two segment endpoints of an associated segment. Each POP is capable of selecting a delivery optimization operation to perform on a packet of the network connection based on a POP identifier, the logical link identifier, and the connection identifier. The packet encodes the logical link identifier and the connection identifier. Each CPE and each POP is capable of performing the delivery optimization operation on the packet based on that identification.

Each CPE and each POP is capable of defining the logical channel to transmit the packet over the physical link. In addition, each CPE and each POP defines a policy of the logical channel. The policy is a path selection policy, a load balancing policy, a replication policy, and/or a timed replay policy. The path selection policy selects a particular physical link to transmit the packet from a first segment endpoint of the associated segment of the logical link to an associated POP and/or an associated CPE located at a second segment endpoint of the associated segment over the associated segment of the logical link based on a preferred path associated with the logical channel.

The load balancing policy selects the particular physical link to transmit the packet from the first segment endpoint of the associated segment to the associated POP and/or the associated CPE located at the second segment endpoint of the associated segment over the associated segment of the logical link based on a round robin algorithm. The replication policy selects at least two physical links over which to simultaneously transmit the packet and the copy of the packet over the associated segment of the logical link. The timed replay policy selects the physical link over which to transmit the packet and schedule a transmission of copy of the packet within a predefined time of transmitting the packet over the physical link.

Furthermore, each CPE and each POP is capable of determining whether to forward the packet to an associated POP and/or an associated CPE. Each CPE and each POP is capable of forwarding the packet to the associated POP and/or the associated CPE based on a determination of whether to forward the packet using a defined policy of the logical channel. The packet is securely transmitted between the branch site and the headquarters site over each segment of the logical link through the network tunnel.

The network tunnel is generated using a tunneling protocol capable of encapsulating a payload protocol by a network protocol across an intervening firewall. Each POP is located such that an application acceleration and a network optimization in the transmission of the packet are dispersed across the system, without being concentrated at the end points thereof.

In yet another aspect, a method includes securely transmitting a packet between a branch site including a branch client and a headquarters site including a headquarters server over each of a first segment, a second segment, and a third segment of a logical link through a network tunnel. The network tunnel is created using a tunneling protocol configured to encapsulate a payload protocol by a network protocol across an intervening firewall. The branch site and the headquarters site are communicatively coupled over the logical link via a transmission media. The logical link is identified through a logical link identifier. The branch client and the headquarters server are communicatively coupled over a network connection via the transmission media. The network connection is identified through a connection identifier.

Further, the method includes implementing a first point of presence (POP) communicatively coupled with a branch customer premise equipment (CPE) located at the branch site over the first segment of the logical link. In addition, the method includes implementing a second POP communicatively coupled to the first POP over the second segment of the logical link. The second POP is communicatively coupled with a headquarters CPE located at the headquarters site over the third segment of the logical link. Each segment of the logical link is constructed from a physical link. Each segment contains two segment endpoints.

The method further includes carrying a network traffic of the network connection by the physical link between the two segment endpoints of an associated segment. Each POP is utilized to select a delivery optimization operation to perform on the packet of the network connection based on a POP identifier, the logical link identifier, and the connection identifier. The packet encodes the logical link identifier and the connection identifier. Furthermore, each POP is utilized to perform the delivery optimization operation on the packet based on that identification.

Each CPE and each POP is utilized to define a logical channel to transmit the packet over the physical link. In addition, each CPE and each POP is utilized to define a policy of the logical channel. The policy is a path selection policy, a load balancing policy, a replication policy, and/or a timed replay policy. The path selection policy selects a particular physical link to transmit the packet from a first segment endpoint of the associated segment of the logical link to an associated POP and/or an associated CPE located at a second segment endpoint of the associated segment over the associated segment of the logical link based on a preferred path associated with the logical channel. The load balancing policy selects the particular physical link to transmit the packet from the first segment endpoint of the associated segment to the associated POP and/or the associated CPE located at the second segment endpoint of the associated segment of the logical link based on a round robin algorithm.

The replication policy selects at least two physical links over which to simultaneously transmit the packet and the copy of the packet over the associated segment of the logical link. The timed replay policy selects the physical link over which to transmit the packet and schedule a transmission of the copy of the packet within a predefined time of transmitting the packet over the physical link. The method also includes transmitting the packet over a particular segment of the logical link using a defined policy of the logical channel. The packet is securely transmitted between the branch site and the headquarters site over each segment of the logical link through the network tunnel.

The network tunnel is generated using the tunneling protocol capable of encapsulating the payload protocol by the network protocol across the intervening firewall. Each POP is located such that an application acceleration and a network optimization in the transmission of the packet are dispersed across a system, without being concentrated at the end points thereof.

The method and system disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which.

Figure 1:
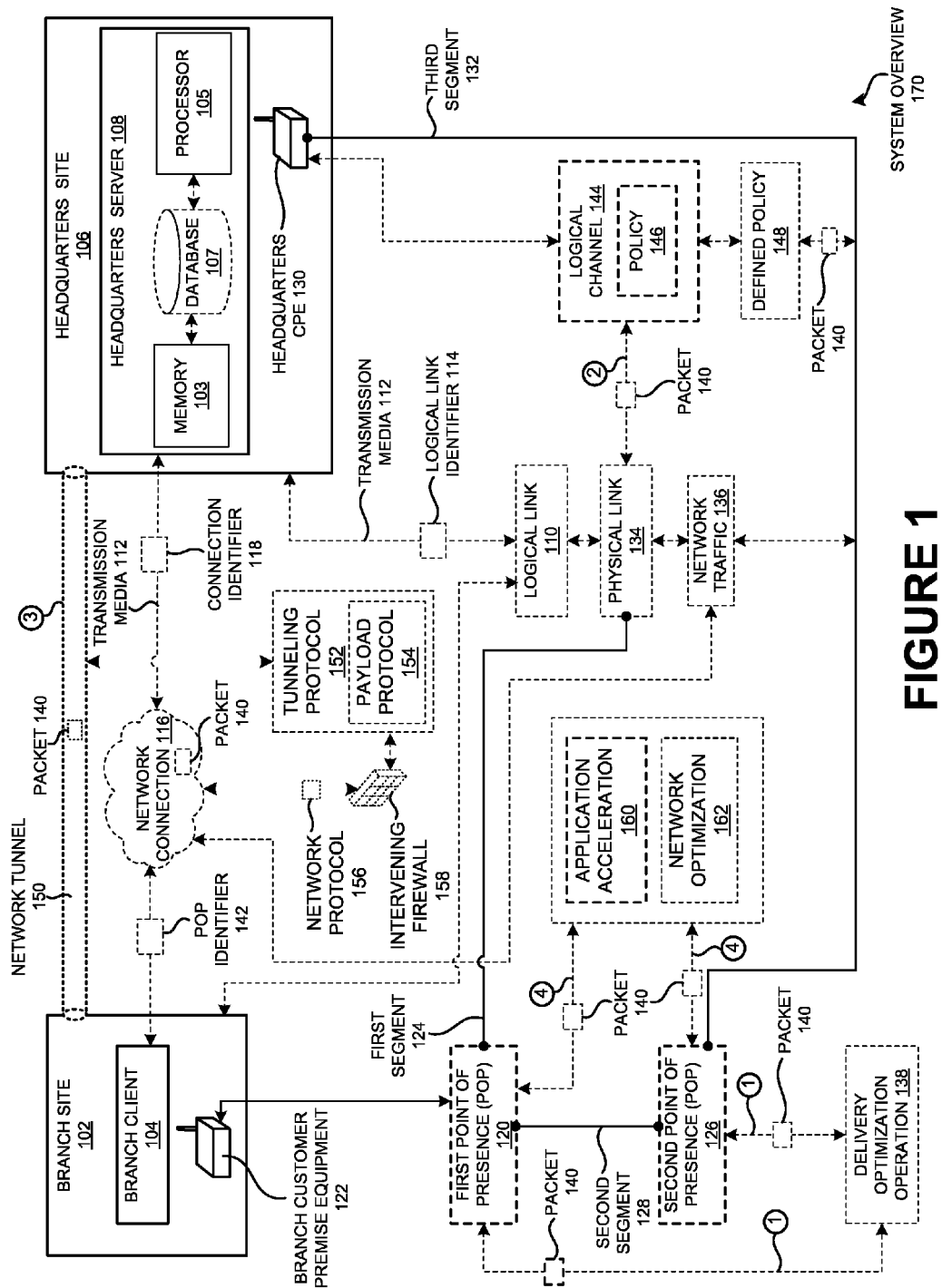
FIG. 1 is a system overview of a branch site and a headquarters site, according to one embodiment.

Other features of the present embodiments will be apparent from the accompanying drawings and from the detailed description that follows.

DETAILED DESCRIPTION

Example embodiments, as described below, may be used to provide a method and/or a system for defining logical channels and channel policies in an application environment. Although, the present embodiments have been described with reference to specific example embodiments, it will be evident that various modifications and changes may be made to these embodiments without departing from the broader spirit and scope of the various embodiments.

In one embodiment, a system includes a branch site 102 including a branch client 104. A headquarters site 106 includes a headquarters server 108. The branch site 102 and the headquarters site 106 are communicatively coupled over a logical link 110 via a transmission media 112. The logical link 110 is identified through a logical link identifier 114. The branch client 104 and the headquarters server 108 are communicatively coupled over a network connection 116 via the transmission media 112. The network connection 116 is identified through a connection identifier 118, according to one embodiment.

A first point of presence (POP) 120 is communicatively coupled with a branch customer premise equipment (CPE) 122 located at the branch site 102 over a first segment 124 of the logical link 110. A second POP 126 is communicatively coupled with the first POP 120 over a second segment 128 of the logical link 110. The second POP 126 is communicatively coupled with a headquarters CPE 130 located at the headquarters site 106 over a third segment 132 of the logical link 110. Each segment of the logical link 110 is constructed from a physical link 134 and contains two segment endpoints. The physical link 134 carries a network traffic 136 of the network connection 116 between the two segment endpoints of an associated segment 201 (e.g., first segment 124, second segment 128, and/or third segment 132), according to one embodiment.

Each POP 120/126 is capable of selecting a delivery optimization operation 138 to perform on a packet 140 of the network connection 116. The network connection 116 is based on a POP identifier 142, the logical link identifier 114, and the connection identifier 118. The packet 140 encodes the logical link identifier 114 and the connection identifier 118. In addition, each POP 120/126 of the system is capable of performing the delivery optimization operation 138 on the packet 140 based on that identification, according to one embodiment.

Each CPE 122/130 and each POP 120/126 is capable of defining a logical channel 144 to transmit the packet 140 over the physical link 134. Further, each CPE 122/130 and each POP 120/126 of the system is capable of defining a policy 146 of the logical channel 144. The policy 146 is a path selection policy 202, a load balancing policy 204, a replication policy 208, and/or a timed replay policy 210. The path selection policy 202 selects a particular physical link 134 to transmit the packet 140 from a first segment endpoint of the associated segment 201 (e.g., first segment 124, second segment 128, and/or third segment 132) of the logical link 110 to an associated POP (e.g., first POP 120 and/or second POP 126) and/or an associated CPE (e.g., branch CPE 122 and/or headquarters CPE 130) located at a second segment endpoint of the associated segment 201 (e.g., first segment 124, second segment 128, and/or third segment 132) over the associated segment 201 (e.g., first segment 124, second segment 128, and/or third segment 132) of the logical link 110 based on a preferred path associated with the logical channel 144. The load balancing policy 204 selects the particular physical link (e.g., physical link 134) to transmit the packet 140 from a first segment endpoint of the associated segment 201 (e.g., first segment 124, second segment 128, and/or third segment 132) of the logical link 110 to an associated POP (e.g., first POP 120 and/or second POP 126) and/or an associated CPE (e.g., branch CPE 122 and/or headquarters CPE 130) located at a second segment endpoint of the associated segment 201 (e.g., first segment 124, second segment 128, and/or third segment 132) over the associated segment 201 (e.g., first segment 124, second segment 128, and/or third segment 132) of the logical link 110 based on a round robin algorithm 206, according to one embodiment.

The replication policy 208 selects two physical links (e.g., physical link 134) over which to simultaneously transmit the packet 140 and the copy of the packet 140 over the associated segment 201 (e.g., first segment 124, second segment 128, and/or third segment 132) of the logical link 110. The timed replay policy 210 selects the physical link 134 over which to transmit the packet 140 and schedule a transmission of the copy of the packet 140 within a predefined time of transmitting the packet 140 over the physical link 134. Each CPE 122/130 and each POP 120/126 is capable of transmitting the packet 140 over the associated segment 201 (e.g., first segment 124, second segment 128, and/or third segment 132) of the logical link 110 using a defined policy 148 of the logical channel 144, according to one embodiment.

The packet 140 is securely transmitted between the branch site 102 and the headquarters site 106 over each segment of the logical link 110 through a network tunnel 150. The network tunnel 150 is generated using a tunneling protocol 152 capable of encapsulating a payload protocol 154 by a network protocol 156 across an intervening firewall 158. Each POP 120/126 is located such that an application acceleration 160 and a network optimization 162 in the transmission of the packet 140 are dispersed across the system, without being concentrated at the end points thereof, according to one embodiment.

The packet 140 to be transmitted may be encapsulated with a channel header 302. The channel header 302 may contain a channel identifier 304, a channel sequence number 306 of the packet 140, and/or a fragment identifier 308. The logical channel 144 may be encapsulated as a User Datagram Protocol (UDP) frame 310. The UDP frame 310 may be used by the first POP 120, the second POP 126, the branch CPE 122, and/or the headquarters CPE 130 receiving the packet 140 to identify (e.g., using an identification function 312) the particular physical link 134 on which the packet 140 was transmitted, according to one embodiment.

Each CPE 122/130 and each POP 120/126 of the system may be further capable of receiving the packet 140. In addition, each CPE 122/13 and each POP 120/126 may be capable of extracting the channel header 302 from the packet 140. Furthermore, each CPE 122/13 and each POP 120/126 may be capable of performing a packet loss recovery 314, a packet reordering 316, a TX-packing 317, and/or a packet fragment coalescence 318 based on an information defined by the channel header 302, according to one embodiment.

The first POP 120 and the second POP 126 may further match an information defined by the channel header 302 against a list of channel selector(s) 320 to select a particular logical channel 144 over which to transmit a packet 140. A channel selector(s) 320 may be a source subnet 322, a destination subnet 324, a Quality of Service (QoS) marking 326, a protocol 328, a source port 330, and/or a destination port 332, according to one embodiment.

Each CPE 122/130 and each POP 120/126 may be further capable of defining a virtual maximum transmission unit (MTU) 336 associated with the logical channel 144. The virtual MTU may be higher than a physical MTU 338 associated with the physical link 134 enabling transmission of the packet 140 when the packet 140 is larger than the physical MTU 338. The defined policy 148 may be the timed replay policy 210 and the path selection policy 202, the load balancing policy 204, and/or the replication policy 208. The defined policy 148 may differ in the two segments of the logical link 110. Each CPE 122/130 and each POP 120/126 may be further capable of defining a Quality of Service (QoS) 326 associated with the logical channel 144, according to one embodiment.

Each CPE 122/130 and each POP 120/126 may be further capable of identifying a channel metric 340 and/or a physical link metric 342. The channel metric 340 may be a channel loss, a channel round-trip time (RTT), a channel jitter, and/or a channel reorder. The physical link metric 342 may be a physical link loss, a physical link RTT, a physical link jitter, and/or a physical link reorder. Each CPE 122/130 and each POP 120/126 may be capable of adjusting a policy behavior 344 associated with the defined policy 148 based on an identified metric 346, according to one embodiment.

In another embodiment, a system includes a branch site 102 including a branch client 104. A headquarters site 106 includes a headquarters server 108. The branch site 102 and the headquarters site 106 are communicatively coupled over a logical link 110 via a transmission media 112. The logical link 110 is identified through a logical link identifier 114. The branch client 104 and the headquarters server 108 are communicatively coupled over a network connection 116 via the transmission media 112. The network connection 116 is identified through a connection identifier 118, according to one embodiment.

A first point of presence (POP) 120 is communicatively coupled with a branch customer premise equipment (CPE) 122 located at the branch site 102 over a first segment 124 of the logical link 110. A second POP 126 is communicatively coupled with the first POP 120 over a second segment 128 of the logical link 110. In addition, the second POP 126 is communicatively coupled with a headquarters CPE 130 located at the headquarters site 106 over a third segment 132 of the logical link 110. Each segment of the logical link 110 is constructed from a physical link 134 and contains two segment endpoints, according to one embodiment.

The physical link 134 carries a network traffic 136 of the network connection 116 between the two segment endpoints of an associated segment 201. Each POP 120/126 is capable of selecting a delivery optimization operation 138 to perform on a packet 140 of the network connection 116 based on a POP identifier 142, the logical link identifier 114, and the connection identifier 118. The packet 140 encodes the logical link identifier 114 and the connection identifier 118. Each CPE 122/130 and each POP 120/126 is capable of performing the delivery optimization operation 138 on the packet 140 based on that identification, according to one embodiment.

Each CPE and each POP is capable of defining the logical channel 144 to transmit the packet 140 over the physical link 134. In addition, each CPE 122/130 and each POP 120/126 defines a policy 146 of the logical channel 144. The policy 146 is a path selection policy 202, a load balancing policy 204, a replication policy 208, and/or a timed replay policy 210. The path selection policy 202 selects a particular physical link 134 to transmit the packet 140 from a first segment endpoint of the associated segment 201 (e.g., first segment 124, second segment 128, and/or third segment 132) of the logical link 110 to an associated POP (e.g., first POP 120 and/or second POP 126) and/or an associated CPE (e.g., branch CPE 122 and/or headquarters CPE 130) located at a second segment endpoint of the associated segment 201 (e.g., first segment 124, second segment 128, and/or third segment 132) over the associated segment 201 (e.g., first segment 124, second segment 128, and/or third segment 132) of the logical link 110 based on a preferred path associated with the logical channel 144, according to one embodiment.

The load balancing policy 204 selects the particular physical link 134 to transmit the packet 140 from a first segment endpoint of the associated segment 201 (e.g., first segment 124, second segment 128, and/or third segment 132) of the logical link 110 to an associated POP (e.g., first POP 120 and/or second POP 126) and an associated CPE (e.g., branch CPE 122 and/or headquarters CPE 130) located at a second segment endpoint of the associated segment 201 (e.g., first segment 124, second segment 128, and/or third segment 132) over the associated segment 201 (e.g., first segment 124, second segment 128, and/or third segment 132) of the logical link 110 based on a round robin algorithm 206. The replication policy 208 selects at least two physical link(s) 134 over which to simultaneously transmit the packet 140 and the copy of the packet 140 over the associated segment 201 (e.g., first segment 124, second segment 128, and/or third segment 132) of the logical link 110. The timed replay policy 210 selects the physical link 134 over which to transmit the packet 140 and schedule a transmission of copy of the packet 140 within a predefined time of transmitting the packet 140 over the physical link 134, according to one embodiment.

Furthermore, each CPE 122/130 and each POP 120/126 is capable of determining whether to forward the packet 140 to an associated POP 120/126 and/or an associated CPE 122/130. Each CPE 122/130 and each POP 120/126 is capable of forwarding the packet 140 to the associated POP 120/126 and the associated CPE 122/130 based on a determination of whether to forward the packet 140 using a defined policy 148 of the logical channel 144. The packet 140 is securely transmitted between the branch site 102 and the headquarters site 106 over each segment of the logical link 110 through the network tunnel 150, according to one embodiment.

The network tunnel 150 is generated using a tunneling protocol 152 capable of encapsulating a payload protocol 154 by a network protocol 156 across an intervening firewall 158. Each POP 120/126 is located such that an application acceleration 160 and a network optimization 162 in the transmission of the packet 140 are dispersed across the system, without being concentrated at the end points thereof, according to one embodiment.

In yet another embodiment, a method includes securely transmitting a packet 140 between a branch site 102 including a branch client 104 and a headquarters site 106 including a headquarters server 108 over each of a first segment 124, a second segment 128, and a third segment 132 of a logical link 110 through a network tunnel 150. The network tunnel 150 is created using a tunneling protocol 152 configured to encapsulate a payload protocol 154 by a network protocol 156 across an intervening firewall 158. The branch site 102 and the headquarters site 106 are communicatively coupled over the logical link 110 via a transmission media 112. The logical link 110 is identified through a logical link identifier 114. The branch client 104 and the headquarters server 108 are communicatively coupled over a network connection 116 via the transmission media 112. The network connection 116 is identified through a connection identifier 118, according to one embodiment.

Further, the method includes implementing a first point of presence (POP) 120 communicatively coupled with a branch customer premise equipment (CPE) 122 located at the branch site 102 over the first segment 124 of the logical link 110. In addition, the method includes implementing a second POP 126 communicatively coupled to the first POP 120 over the second segment 128 of the logical link 110. The second POP 126 is communicatively coupled with a headquarters CPE 130 located at the headquarters site 106 over the third segment 132 of the logical link 110. Each segment of the logical link 110 is constructed from a physical link 134. Each segment contains two segment endpoints, according to one embodiment.

The method further includes carrying a network traffic 136 of the network connection 116 by the physical link 134 between the two segment endpoints of an associated segment 201 (e.g., first segment 124, second segment 128, and/or third segment 132). Each POP 120/126 is utilized to select a delivery optimization operation 138 to perform on the packet 140 of the network connection 116 based on a POP identifier 142, the logical link identifier 114, and the connection identifier 118. The packet 140 encodes the logical link identifier 114 and the connection identifier 118. Furthermore, each POP is utilized to perform the delivery optimization operation 138 on the packet 140 based on that identification, according to one embodiment.

Each CPE 122/130 and each POP 120/126 is utilized to define a logical channel 144 to transmit the packet 140 over the physical link 134. In addition, each CPE 122/130 and each POP 120/126 is utilized to define a policy 146 of the logical channel 144. The policy 146 is a path selection policy 202, a load balancing policy 204, a replication policy 208, and/or a timed replay policy 210. The path selection policy 202 selects a particular physical link 134 to transmit the packet 140 from a first segment endpoint of the associated segment 201 (e.g., first segment 124, second segment 128, and/or third segment 132) of the logical link 110 to an associated POP (e.g., first POP 120 and/or POP 126) and/or an associated CPE (e.g., branch CPE 122 and/or headquarters CPE 130) located at a second segment endpoint of the associated segment 201 (e.g., first segment 124, second segment 128, and/or third segment 132) over the associated segment 201 (e.g., first segment 124, second segment 128, and/or third segment 132) of the logical link 110 based on a preferred path associated with the logical channel 144. The load balancing policy 204 selects the particular physical link 134 to transmit the packet 140 from a first segment endpoint of the associated segment 201 (e.g., first segment 124, second segment 128, and/or third segment 132) of the logical link 110 to an associated POP (e.g., first POP 120 and/or second POP 126) and/or an associated CPE (e.g., branch CPE 122 and/or headquarters CPE 130) located at a second segment endpoint of the associated segment 201 (e.g., first segment 124, second segment 128, and/or third segment 132) over the associated segment 201 (e.g., first segment 124, second segment 128, and/or third segment 132) of the logical link 110 based on a round robin algorithm 206, according to one embodiment.

The replication policy 208 selects at least two physical link(s) 134 over which to simultaneously transmit the packet 140 and the copy of the packet 140 over the associated segment 201 (e.g., first segment 124, second segment 128, and/or third segment 132) of the logical link 110. The timed replay policy 210 selects the physical link 134 over which to transmit the packet 140 and schedule a transmission of the copy of the packet 140 within a predefined time of transmitting the packet 140 over the physical link 134. The method also includes transmitting the packet 140 over a particular segment (e.g., first segment 124, second segment 128, and/or third segment 132) of the logical link 110 using a defined policy 148 of the logical channel 144. The packet 140 is securely transmitted between the branch site 102 and the headquarters site 106 over each segment of the logical link 110 through the network tunnel 150, according to one embodiment.

The network tunnel 150 is generated using the tunneling protocol 152 capable of encapsulating the payload protocol 154 by the network protocol 156 across the intervening firewall 158. Each POP 120/126 is located such that an application acceleration 160 and a network optimization 162 in the transmission of the packet 140 are dispersed across a system, without being concentrated at the end points thereof, according to one embodiment.

FIG. 1 is a system overview 170 of a branch site 102 and a headquarters site 106, according to one embodiment. Particularly, FIG. 1 illustrates a branch site 102, a memory 103, a branch client 104, a processor 105, a headquarters site 106, a database 107, a headquarters server 108, a logical link 110, a transmission media 112, a logical link identifier 114, a network connection 116, a connection identifier 118, a first point of presence (POP) 120, a branch customer premise equipment (CPE) 122, a first segment 124, a second point of presence (POP) 126, a second segment 128, a headquarters customer premise equipment (CPE) 130, a third segment 132, a physical link 134, a network traffic 136, a delivery optimization operation 138, a packet 140, a POP identifier 142, a logical channel 144, a policy 146, a defined policy 148, a network tunnel 150, a tunneling protocol 152, a payload protocol 154, a network protocol 156, a intervening firewall 158, an application acceleration 160, and a network optimization 162, according to one embodiment.

The branch site 102 may be a remotely located area, a region, a physical environment, a building, and/or a locality other than the corporate main site (e.g., headquarters site 106) where business is conducted. The branch site 102 may include the branch client 104. The branch client 104 may be a personal computer and/or a software application that requests and/or makes use of services provided by the headquarters server 108 of the headquarters site 106. The headquarters site 106 may be a region, a physical environment, and/or a building which controls and/or directs the activities of the branch site 102, according to one embodiment.

The headquarters server 108 may be a computer or a computer program which manages access to a centralized resource or a service to the branch site 102 through a network connection 116. The logical link 110 may be used as logical path for communication between the branch client 104 and headquarters server 108. The transmission media 112 may be the pathway that carries data from one place to another (e.g., from branch site 102 to headquarters site 106 and vice versa), according to one embodiment.

The logical link identifier 114 may be a node identifier at the ends of the logical link 110. In another embodiment, the logical link identifier 114 may provide the signaling address for communication between the branch client 104 and headquarters server 108. The network connection 116 may be an interconnection between branch site 102 and headquarters site 106 allowing information to be exchanged. A connection identifier 118 may be a unique string representing the name of the internet connection. The name could then be used as a placeholder to indicate the network connection 116 itself. The first point of presence (POP) 120 may be the first access point, location, and/or facility at which two or more different networks or communication devices build a connection with each other. In another embodiment, the first point of presence (POP) 120 may enable users to connect to the Internet via their ISP, according to one embodiment.

The branch customer premise equipment (CPE) 122 may be the telecommunications hardware located at the physical location (e.g., branch site 102). The branch CPE 122 may generally refer to devices such as telephones, routers, switches, residential gateways (RG), set-top boxes, fixed mobile convergence products, and Internet access gateways that enable consumers to access communications service providers' services, according to one embodiment.

The first segment 124 may be a first portion of a computer network that is separated from the rest of the network (e.g., network connection 116) by a device such as a repeater, hub, bridge, switch, and/or router. The second segment 128 may be a second portion of a computer network that is separated from the rest of the network (e.g., network connection 116) by a device such as a repeater, hub, bridge, switch, and/or router, according to one embodiment.

The headquarters CPE 130 may be communications terminal and/or communications equipment located at the headquarters site 106. The headquarters CPE 130 may facilitate the delivery of services. The third segment 132 may be a third portion of a computer network that is separated from the rest of the network (e.g., network connection 116) by a device such as a repeater, hub, bridge, switch, and/or router. Each segment (e.g., first segment 124, second segment 128, and/or third segment 132) may contain one or multiple computers and/or hosts, according to one embodiment.

The physical link 134 may be the connection between two devices. In another embodiment, the physical link 134 may be used as transmission media 112 that connects branch client 104 and headquarters server 108 to POP 120/126. The network traffic 136 (e.g., data traffic) may be the data in a network connection 116. In computer networks (e.g., network connection 116), the data may be encapsulated in the network packets (e.g., packet 140). In another embodiment, the network traffic 136 may be the number of packets (e.g., packet 140) sent and/or received. The network traffic 136 may monitor the packet 140. The delivery optimization operation 138 may be performed on the packet 140

The packet 140 may be the unit of data that is routed between an origin and a destination (between a branch site 102 and headquarters site 106) over the network connection 116. The POP identifier 142 may be a POP id. The POP identifier may find which POP (e.g., first point of presence (POP) 120 or second point of presence (POP) 126 the packet 140 has reached. The logical channel 144 may consist of the information carried over the physical channel. In another embodiment, the logical channel 144 may be designed to carry a different message. Most logical channel 144 takes only one time slot to transmit, according to one embodiment.

The policy 146 may include management of a network so that various kinds of network traffic 136 (e.g., data, video, and/or voice) get the priority of availability and/or bandwidth needed to serve the network users (e.g., branch client 104 and/or headquarters server 108). The policy 149 may be a path selection policy 202, a load balancing policy 204, a replication policy 208, and/or a timed replay policy 210, according to one embodiment. The defined policy 148 may be the policy 146. The defined policy 148 is used to transmit a packet 140 over a particular segment (e.g., first segment 124, second segment 128, and/or third segment 132) of the logical link 110, according to one embodiment.

The network tunnel 150 may be special type of connection across a network connection 116. The packet 140 is securely transmitted between the branch site 102 and the headquarters site 106 over each segment (e.g., first segment 124, second segment 128, and/or third segment 132) of the logical link 110 through the network tunnel 150. A network tunnel 150 may be created using a tunneling protocol 152. The tunneling protocol 152 may be a network protocol that encapsulates packets (e.g., packet 140). The tunneling protocol 152 may allow network users (e.g., branch client 104 and/or headquarters server 108) to access and/or provide a network service that the underlying network does not support or provide directly, according to one embodiment.

The payload protocol 154 may be a set of predetermined rules that includes the actual data being sent over network connection 116. The network protocol 156 may be a set of predetermined rules that allow two entities (e.g., branch client 104 and headquarters site 106) to communicate. The network protocol 156 may govern the end-to-end processes of timely, secure and/or managed data or network communication. The intervening firewall 158 may block the communication between the headquarters server 108 and the branch client 104. In another embodiment, the intervening firewall 158 may block the intervening traffic, according to one embodiment.

The application acceleration 160 as a service may be a method to accelerate performance of the centralized application located at the headquarters site 106 or headquarters server 108 for the user at the branch site 102 or branch client 104. The performance of the centralized application being accessed by the requesting site (e.g., branch site 102 or branch client 104) may depend on latency and/or bandwidth. The application acceleration 160 may ensure the availability, stability, and/or performance in application networking. The network optimization 162 may improve application throughput, mitigate the impact of latency and loss, and/or minimize bandwidth consumption, according to one embodiment.

FIG. 1 illustrates branch site 102 includes a branch client 104 and branch customer premise equipment (CPE) 122. The headquarters site 106 includes headquarters server 108 and headquarters CPE 130. The headquarters server 108 consists of a memory 103, a processor 105, and a database 107. The branch site 102 and headquarters server 108 are communicatively coupled over a logical link 110 via a transmission media 112. The logical link 110 is identified through a logical link identifier 114. The branch client 104 and the headquarters server 108 are communicatively coupled over a network connection 116 via the transmission media 112. The network connection 116 is identified through a connection identifier 118, according to one embodiment.

A first point of presence (POP) 120 is communicatively coupled with a branch customer premise equipment (CPE) 122 located at the branch site 102 over a first segment 124 of the logical link 110. A second POP 126 is communicatively coupled with the first POP 120 over a second segment 128 of the logical link 110. The second POP 126 is communicatively coupled with a headquarters CPE 130 located at the headquarters site 106 over a third segment 132 of the logical link 110. Each segment of the logical link 110 is constructed from a physical link 134 and contains two segment endpoints. The physical link 134 carries a network traffic 136 of the network connection 116 between the two segment endpoints of an associated segment 201 (e.g., first segment 124, second segment 128, and/or third segment 132), according to one embodiment.

In circle '1', a delivery optimization operation 138 is selected by each POP 120/126 to perform on the packet 140 of the network connection 116 based on a POP identifier 142, the logical link identifier 114, and the connection identifier 118. The packet 140 encodes the logical link identifier 114 and the connection identifier 118. The delivery optimization operation 138 is performed on the packet 140 based on that identification, according to one embodiment.

In circle '2', each POP 120/126 and each CPE 122/130 is capable of defining the logical channel 144 to transmit the packet 140 over the physical link 134, according to one embodiment. Further, each CPE 122/130 and POP 120/126 of the system is capable of defining a policy 146 of the logical channel 144. Each CPE 122/130 and POP 120/126 is capable of transmitting the packet 140 over a particular segment (e.g., first segment 124, second segment 128, and/or third segment 132) of the logical link 110 using a defined policy 148 of the logical channel 144, according to one embodiment.

In circle '3', the packet 140 is securely transmitted between the branch site 102 and the headquarters site 106 over each segment (e.g., first segment 124, second segment 128, and/or third segment 132) of the logical link 110 through the network tunnel 150. The network tunnel 150 is generated using a tunneling protocol 152 capable of encapsulating a payload protocol 154 by a network protocol 156 across an intervening firewall 158, according to one embodiment. In circle '4', each POP 120/126 is located such that the application acceleration 160 and a network optimization 162 in the transmission of the packet 140 are dispersed across the system, according to one embodiment.

Figure 2:
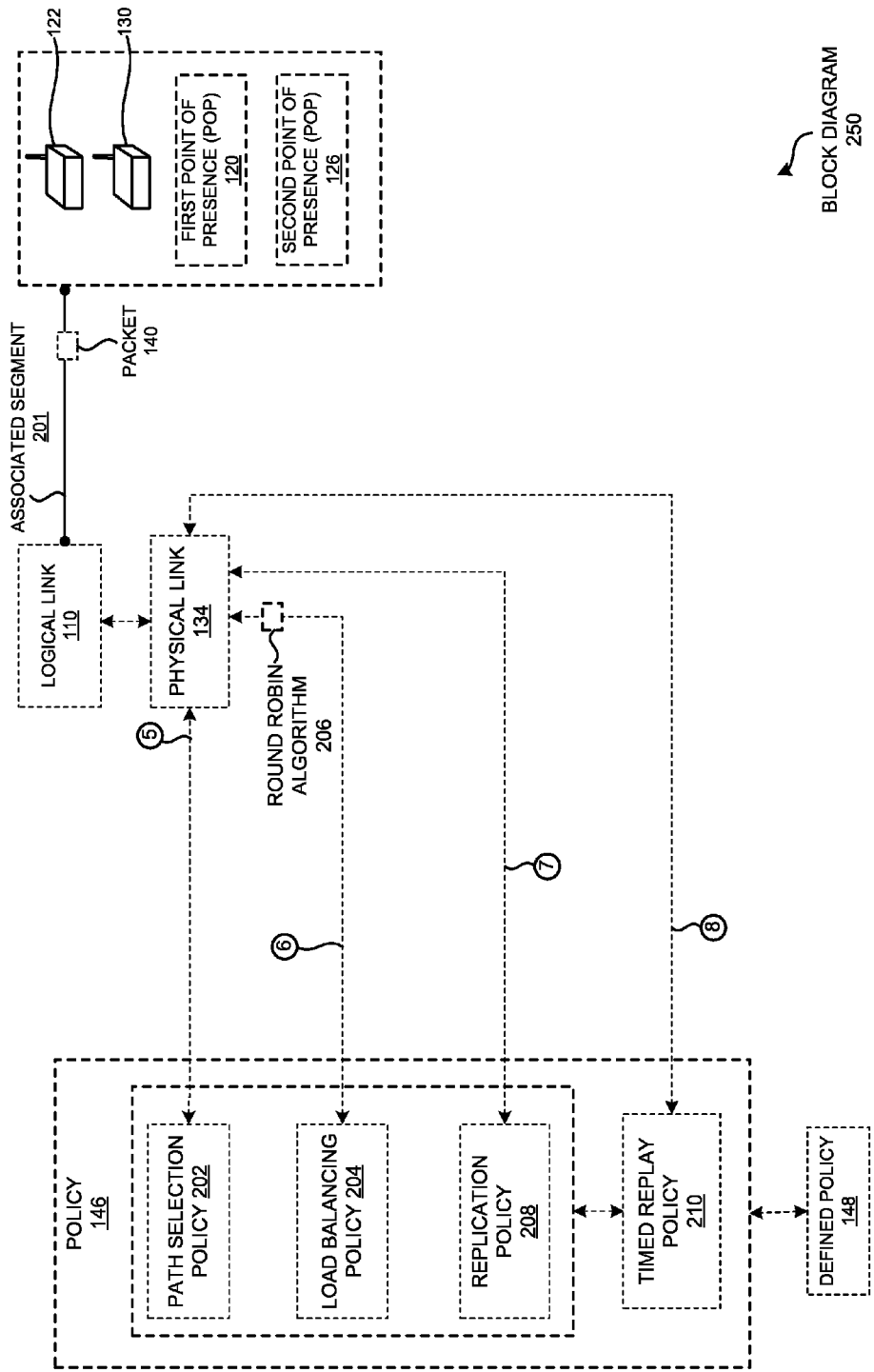
FIG. 2 is a block diagram illustrating relationship between a policy and a physical link, according to one embodiment.

FIG. 2 is a block diagram 250 illustrating relationship between a policy 146 and a physical link 134 of FIG. 1, according to one embodiment. Particularly, FIG. 2 builds on FIG. 1, and further adds an associated segment 201, a path selection policy 202, a load balancing policy 204, a round robin algorithm 206, a replication policy 208, and a timed replay policy 210, according to one embodiment.

The associated segment 201 may be a particular segment of the logical link 110 (e.g., e.g., first segment 124, second segment 128, and/or third segment 132) associated with a particular POP and a particular CPE. For example, the first segment 124 may be the associated segment for the branch CPE 122 and the first POP 120. The path selection policy 202 may involve applying a routing metric to multiple routes to select and/or predict the best route. In another embodiment, the path selection policy 202 may include finding a path with sufficient resources. The path selection policy 202 selects a particular physical link (e.g., physical link 134) to transmit the packet 140 to the second POP 126 over the second segment 128 of the logical link 110 based on a preferred path associated with the logical channel 144, according to one embodiment. The path selection policy 202 may be beneficial in efficiently using the physical link(s) 134 based on a cost determination.

The load balancing policy 204 may include balancing the network traffic 136 across the network connection 116 over multiple connections in order to spread out the amount of bandwidth used by each client (e.g., branch client 104), helping to enhance the scalability and availability. The load balancing policy 204 selects the particular physical link (e.g., physical link 134) to transmit the packet 140 to the second POP 126 over the second segment 128 of the logical link 110 based on a round robin algorithm 206, according to one embodiment. The load balancing policy 204 may improve the utilization of available resources.

The round robin algorithm 206 may be a scheduling algorithm employed to schedule a data packet 140 in computer networks. The round robin algorithm 206 may be designed for time sharing systems. The replication policy 208 may include reproducing the packet 140 at the optimal locations and/or delivering to all the receivers (e.g., branch client 104 and/or headquarters server 108) over the network connection 116. The replication policy 208 selects the two physical links (e.g., physical link 134) over which to simultaneously transmit the packet 140 and the copy of the packet 140, according to one embodiment.

The timed replay policy 210 may include planning the time slot of the transmission of the copy of the packet 140. The timing of the transmission of the copy of the packet 140 may be static or derived from a feedback mechanism. In another embodiment, timed replay policy 210 selects the physical link 134 over which to transmit the packet 140 and schedule a transmission of the copy of the packet 140 within a predefined time of transmitting the packet 140 over the physical link 134, according to one embodiment. The replication policy 208 and the timed replay policy 210 may result in voice over internet protocol (VOIP) enhancement in lossy environments through loss reduction and improved jitter. Further, the replication policy 208 and the timed replay policy 210 may further be used to reduce end-to-end loss in remote desktop protocols (RDPs), Citrix® protocols, and other protocols which do not currently benefit from transmission control protocol (TCP) optimization. Each policy 146 is uniformally enforced in either direction for a particular type of network traffic 136, and of one physical link 134 fails then the network traffic 136 can fold back to another physical link 134. Moreover, using the defined policy(ies) 148 can result in the effective loss being brought down to 1% where each individual physical link 134 has a probability of 10% loss on the link.

FIG. 2 illustrates the policy 146 including the path selection policy 202, the load balancing policy 204, the replication policy 208, the timed replay policy 210. The timed replay policy 210 is associated with the path selection policy 202, the load balancing policy 204, and the replication policy 208. The defined policy 148 is associated with policy 146.

In circle '5', the path selection policy 202 selects a particular physical link (e.g., physical link 134) to transmit the packet 140 from a first segment endpoint of the associated segment 201 (e.g., first segment 124, second segment 128, and/or third segment 132) of the logical link 110 to an associated POP (e.g., first POP 120 and/or second POP 126) and/or an associated CPE (e.g., branch CPE 122 and/or headquarters CPE 130) located at a second segment endpoint of the associated segment (e.g., first segment 124, second segment 128, and/or third segment 132) over the associated segment 201 (e.g., first segment 124, second segment 128, and/or third segment 132) of the logical link 110 based on a preferred path associated with the logical channel 144, according to one embodiment.

In circle '6', the load balancing policy 204 selects the particular physical link 134 to transmit the packet 140 from a first segment endpoint of the associated segment 201 (e.g., first segment 124, second segment 128, and/or third segment 132) of the logical link 110 to an associated POP (e.g., first POP 120 and/or second POP 126) and/or an associated CPE (e.g., branch CPE 122 and/or headquarters CPE 130) located at a second segment endpoint of the associated segment 201 (e.g., first segment 124, second segment 128, and/or third segment 132) over the associated segment 201 (e.g., first segment 124 and/or second segment 128) of the logical link 110 based on a round robin algorithm 206, according to one embodiment.

Figure 3:
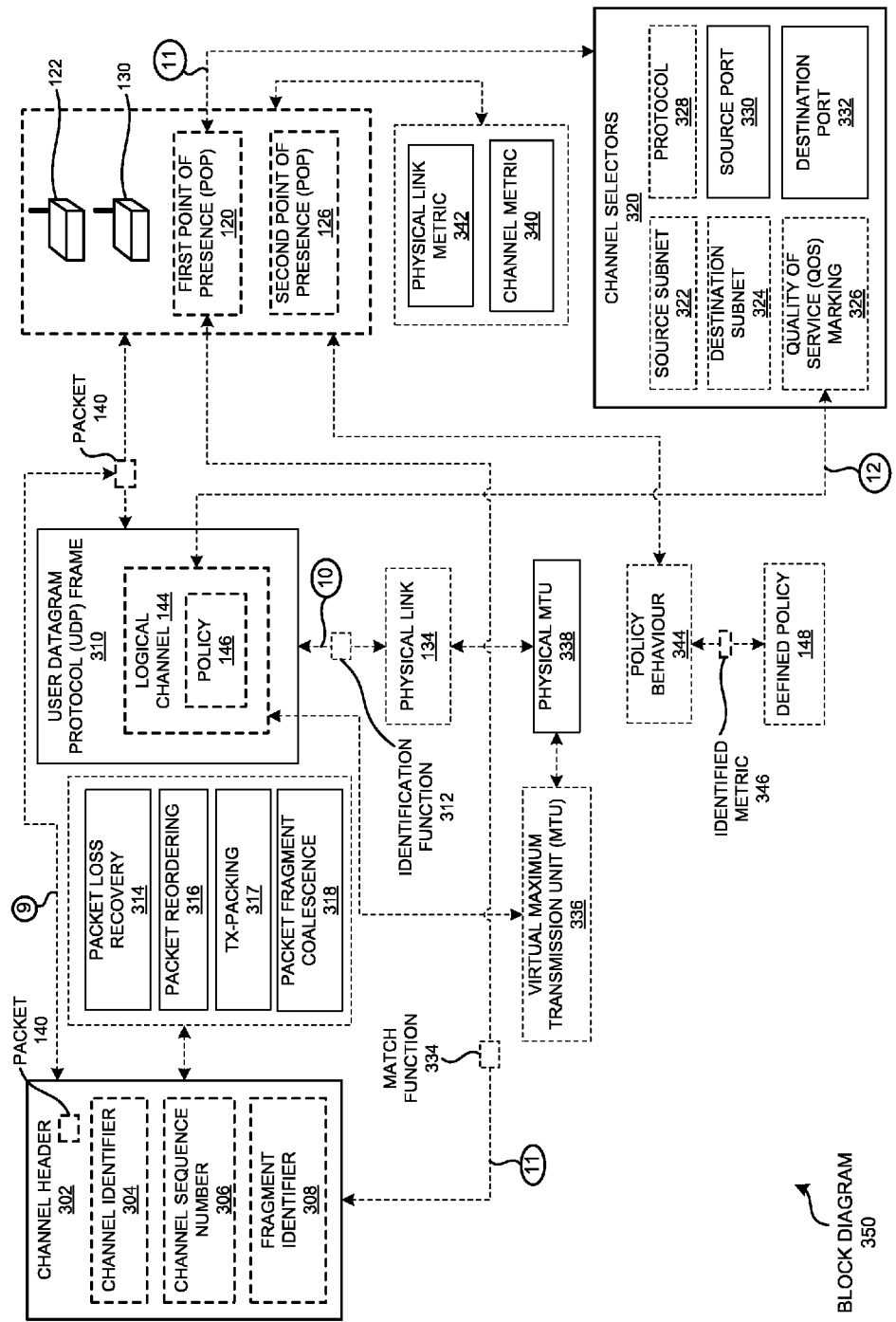
FIG. 3 is a block diagram illustrating the matching of a first POP by a channel header against a list of channel selectors, according to one embodiment.

In circle '7', the replication policy 208 selects the two physical link(s) 134 over which to simultaneously transmit the packet 140 and the copy of the packet 140 over the associated segment (e.g., first segment 124, second segment 128, and/or third segment 132) of the logical link 110, according to one embodiment. In circle '8', the timed replay policy 210 selects the physical link 134 over which to transmit the packet 140 and schedule a transmission of the copy of the packet 140 within a predefined time of transmitting the packet 140 over the physical link 134, according to one embodiment. FIG. 3 is a block diagram 350 illustrating the matching of a first POP 120 of FIG. 1 by a channel header 302 against a list of channel selectors 320, according to one embodiment. Particularly, FIG. 3 builds on FIG. 1, and further adds a channel header 302, a channel identifier 304, a channel sequence number 306, a fragment identifier 308, an user datagram protocol (UDP) frame 310, an identification function 312, a packet loss recovery 314, a packet reordering 316, a TX-packing 317, a packet fragment coalescence 318, a channel selectors 320, a source subnet 322, a destination subnet 324, a quality of service (QoS) marking 326, a protocol 328, a source port 330, a destination port 332, a match function 334, a virtual maximum transmission unit (MTU) 336, a physical MTU 338, a channel metric 340, a physical link metric 342, a policy behavior 344, and an identified metric 346, according to one embodiment.

The channel header 302 may contain the information required by the receiving gateway. The channel identifier 304 may be an identifier of communication channel. The channel sequence number 306 may be included on each transmitted packet 140, and acknowledged by the opposite host (e.g., branch client 104 or headquarters server 108) as acknowledgement number to inform the sending host (e.g., headquarters server 108 or branch client 104) that the transmitted data was received successfully, according to one embodiment.

The fragment identifier 308 may be short string of characters that refers to a resource that is subordinate to another, primary resource. The fragment identifier 308 may point to the subordinate resource, according to one embodiment. In another embodiment, the fragment identifier 308 may represent a part of, fragment of, or a sub-function within, an object. The syntax and semantics may be defined by the application responsible for the object and/or the specification of the content type of the object, according to one embodiment.

The User Datagram Protocol (UDP) frame 310 may be a digital data transmission unit in computer networking within the TCP/IP protocol suite that is used in place of TCP when a reliable delivery is not required. The UDP frame is used by first POP 120, second POP 126, branch CPE 122, headquarters CPE 130 receiving the packet 140 to identify the particular physical link (e.g., physical link 134) on which the packet 140 was transmitted, according to one embodiment.

The identification function 312 may be a set of instructions that performs a specific task of recognizing the particular physical link (e.g., physical link 134) on which the packet 140 was transmitted. The packet loss recovery 314 may include retransmission of dropped packet 140 to the end points between the branch site 102 and headquarters site 106. The packet loss may occur when one or more packets (e.g., packet 140) of data travelling across a computer network fail to reach their destination. The packet loss may be typically caused by network congestion, according to one embodiment.

The packet reordering 316 may be a phenomenon in which packets (e.g., packet 140) with higher sequence numbers are received earlier than with smaller sequence numbers. The TX-packing 317 may be a technique used to pack smaller sized application packets into a single channel packet (e.g., packet 140). The TX-packing 317 may help to reduce the number of packets (e.g., packet 140) that are required in order to transmit the same amount of data. Therefore, the TX-packing 317 may improve efficiency, especially in scenarios where there are network elements that are limited in packets per second processing capabilities. The packet fragment coalescence 318 may be joining of multiple packets of smaller size. The channel selectors 320 may include source subnet 322, destination subnet 324, Quality of Service (QoS) marking 326, protocol 328, source port 330, destination port 332. The source subnet 322 may be a portion of the network connection 116 at the source side (e.g., branch site 102 and/or headquarters site 106) that shares a common address component.

In another embodiment, a source subnet 322 may represent all the machines at one geographic location (e.g., headquarters site 106 and/or branch site 102). The destination subnet 324 may be a logical and/or visible subdivision of the network connection 116 at the destination side (e.g., headquarters site 106 and/or branch site 102). The Quality of Service (QoS) marking 326 may give critical traffic preferential treatment reliably to make sure it is delivered quickly and/or reliably. The Quality of Service (QoS) marking 326 may create different classifications of service for different kinds of network traffic 136, according to one embodiment.

The protocol 328 may be a set of rules and/or conventions that govern the communication between network devices (e.g., branch client 104 and headquarters server 108). The protocol 328 may use packet switching techniques to send and/or receive messages in the form of packet 140. The protocol 328 may be TCP protocol or a UDP protocol. The source port 330 may refer to a port from which the packet 140 is sent (e.g., a TCP port). The destination port 332 may refer to a port number of the headquarters server 108, according to one embodiment.

The match function 334 may be the set of instructions that involves the first point of presence (POP) 120 matching an information defined by the channel header 302 against a list of channel selectors 320 to select a particular logical channel (e.g., logical channel 144) over which to transmit a packet 140. The virtual Maximum Transmission Unit (MTU) 336 may be defined as the largest packet 140 size, measured in bytes or octets, which can be sent over a network connection 116, according to one embodiment. The virtual MTU 336 may be higher than the physical MTU 238 associated with the physical link 143 enabling transmission of the packet 140. The physical MTU 338 is an MTU associated with the physical link. The physical MTU 338 is the largest packet size, measured in bytes or octets, which the physical link is capable of transmitting. The physical MTU 338 may be smaller than the virtual MTU 336.

The channel metric 340 may be a channel loss, a channel round-trip time (RTT), a channel jitter, and/or a channel reorder. The physical link metric 342 may be a physical link loss, a physical link RTT, a physical link jitter, and/or a physical link reorder. The identified metric 346 may be the channel metric 340 and/or physical link metric 342, according to one embodiment.

Particularly, FIG. 3 illustrates the channel header 302 and the first point of presence (POP) 120 are communicatively coupled using the match function 334. The logical channel 144 is associated with a list of the channel selectors 320, according to one embodiment.

In circle '9', the packet 140 to be transmitted may be encapsulated with the channel header 302. The channel header 302 may contain a channel identifier 304, a channel sequence number 306 of the packet 140, and/or a fragment identifier 308. The logical channel 144 may be encapsulated as a User Datagram Protocol (UDP) frame 310. In circle '10', the UDP frame 310 may be used by the first POP 120, the second POP 126, a branch CPE 122, and/or a headquarters CPE 130 receiving the packet 140 to identify (e.g., using an identification function 312) the particular physical link (e.g., physical link 134) on which the packet 140 was transmitted.

Each CPE 122/130 and each POP 120/126 of the system may be capable of receiving the packet 140. Each CPE 122/130 and each POP 120/126 may be capable of extracting the channel header 302 from the packet 140. Furthermore, each CPE 122/13 and each POP 120/126 may be capable of performing a packet loss recovery 314, a packet reordering 316, and/or a packet fragment coalescence 318.

In circle '11', the first POP 120 may be matching (e.g., using the match function 334) an information defined by the channel header 302 against a list of channel selectors 320 to select a particular logical channel (e.g., using a logical channel 144) to transmit a packet 140. Each CPE 122/130 and each POP 120/126 may be capable of defining a virtual maximum transmission unit (MTU) 336 associated with the logical channel 144. The virtual MTU 336 may be higher than a physical MTU 338 associated with the physical link 134 enabling transmission of the packet 140. The defined policy 148 may differ in the two segments of the logical link 110.

In circle '12', each CPE 122/130 and each POP 120/126 may be capable of defining a QoS 326 associated with the logical channel 144 of FIG. 1, according to one embodiment. Each CPE 122/130 and each POP 120/126 may be capable of identifying a channel metric 340 and/or a physical link metric 342. Each CPE 122/130 and each POP 120/126 may be capable of adjusting a policy behavior 344 associated with the defined policy 148 based on an identified metric 346.

Figure 4:
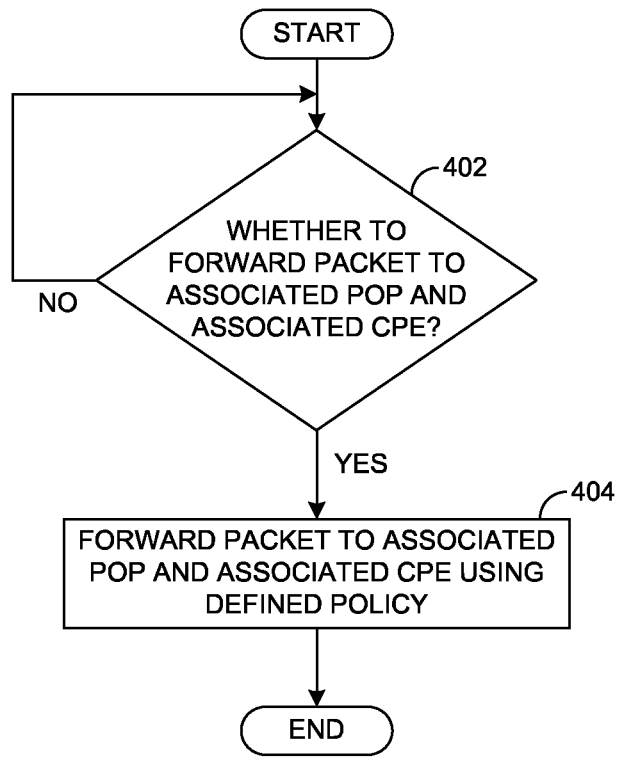
FIG. 4 is a flow diagram illustrating the transmission of packet to each POP, according to one embodiment.

FIG. 4 is a flow diagram 450 illustrating the transmission of packet 140 to each POP 120/126 of FIG. 1, according to one embodiment. FIG. 4 is a flow diagram illustrating the transmission of packet 140 to each POP 120/126, according to one embodiment. In operation 402, each CPE 122/130 and each POP 120/126 is capable to determine whether to forward the packet 140 to an associated POP 120/126 and an associated CPE 122/130, according to one embodiment. In operation 404, the packet 140 is forwarded to the associated POP 120/126 and the associated CPE 122/130 using the defined policy 148 of the logical channel 144, according to one embodiment.

Figure 5A:
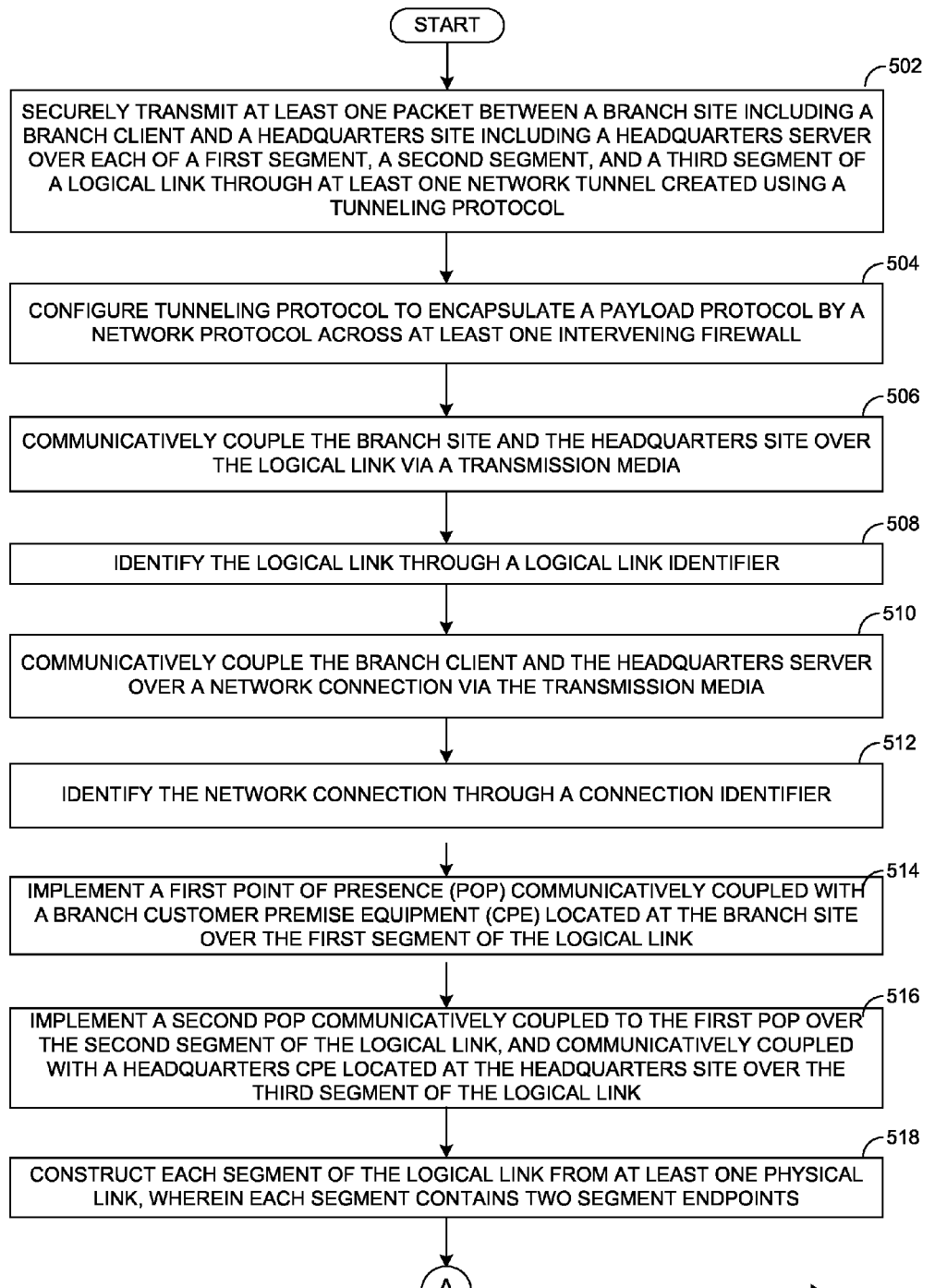
FIG. 5A is a process flow of transmission of the packet over a segment of the logical link, according to one embodiment.

FIG. 5A is a process flow 550 of transmission of the packet 140 over a segment of the logical link 110 of FIG. 1, according to one embodiment. In operation 502, at least one packet may be securely transmitted between a branch site 102 including a branch client 104 and a headquarters site 106 including a headquarters server 108 over each of a first segment 124, a second segment 128, and/or a third segment 132 of a logical link 110 through at least one network tunnel 150 created using a tunneling protocol 152, according to one embodiment.

In operation 504, a tunneling protocol 152 may be configured to encapsulate a payload protocol 154 by a network protocol 156 across at least one intervening firewall 158. In operation 506, the branch site 102 and the headquarters site 106 may be communicatively coupled over the logical link 110 via a transmission media 112. In operation 508, the logical link 110 may be identified through a logical link identifier 114. In operation 510, the branch client 104 and the headquarters server 108 may be communicatively coupled over a network connection 116 via the transmission media 112. In operation 512, the network connection 116 may be identified through a connection identifier 118, according to one embodiment.

In operation 514, a first point of presence (POP) 120 communicatively coupled with a branch customer premise equipment (CPE) 122 located at the branch site 102 over the first segment 124 of the logical link 110 may be implemented. In operation 516, a second POP 126 communicatively coupled to the first POP 120 over the second segment 128 of the logical link 110 may be implemented. The second POP 126 may be communicatively coupled with a headquarters CPE 130 located at the headquarters site 106 over the third segment 132 of the logical link 110. In operation 518, each segment (e.g., first segment 124, second segment 126, and/or third segment 132) of the logical link 110 may be constructed from at least one physical link 134, wherein each segment (e.g., first segment 124, second segment 126, and/or third segment 132) contains two segment endpoints, according to one embodiment.

Figure 5B:
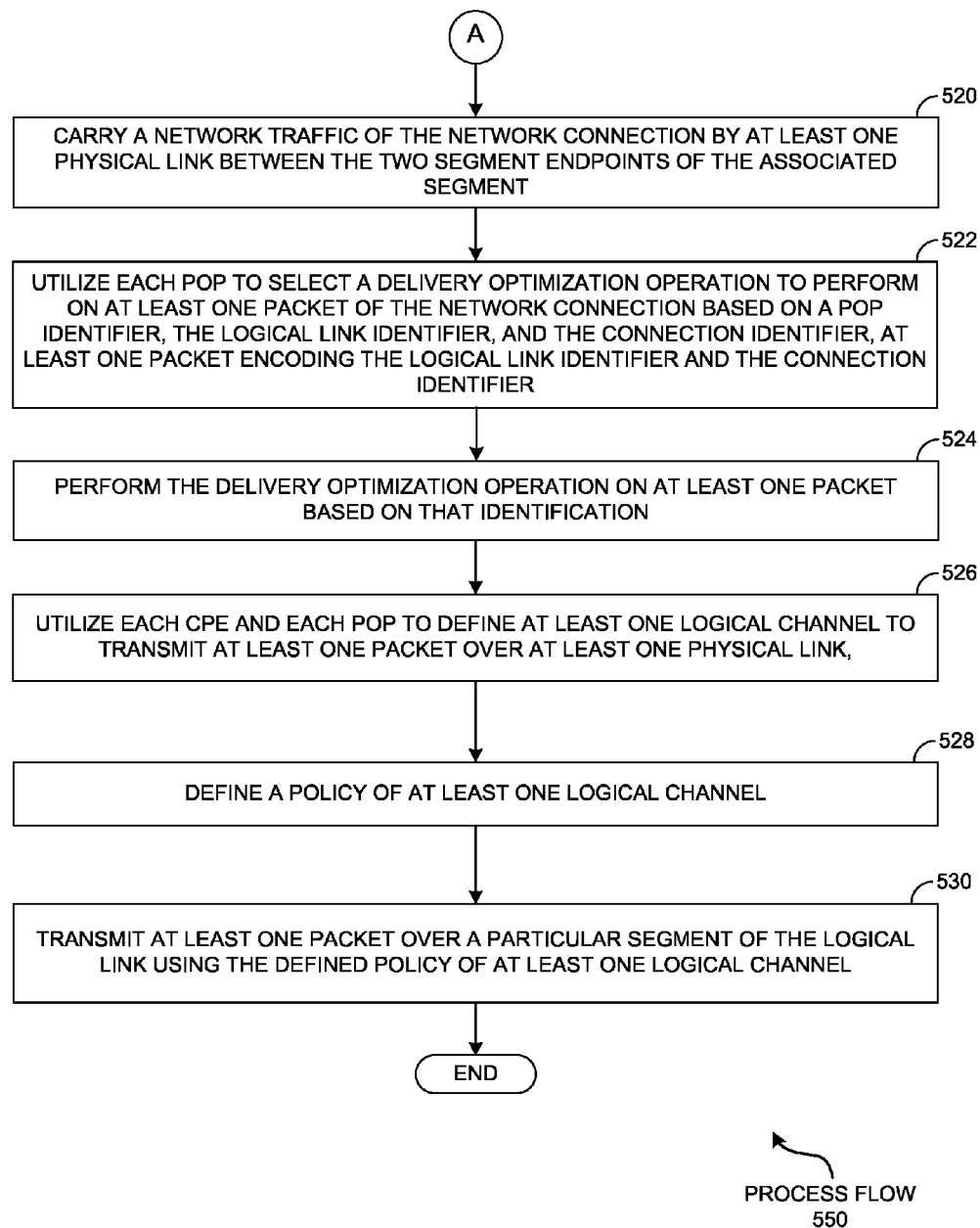
FIG. 5B is a continuation of FIG. 5A, according to one embodiment.

FIG. 5B is a continuation of FIG. 5A, according to one embodiment. In operation 520, a network traffic 136 of the network connection 116 may be carried by at least one physical link 134 between the two segment endpoints of an associated segment (e.g., first segment 124, second segment 126, and/or third segment 132). In operation 522, each POP 120/126 may be utilized to select a delivery optimization operation 138 to perform on at least one packet 140 of the network connection 116 based on a POP identifier 142, the logical link identifier 114, and the connection identifier 118. The packet 140 may be encoding the logical link identifier 114 and the connection identifier 118, according to one embodiment.

In operation 524, each POP 120/126 may be utilized to perform the delivery optimization operation 138 on at least one packet 140 based on that identification. In operation 526, each CPE 122/130 and each POP 120/126 may be utilized to define at least one logical channel 144 to transmit at least one packet 140 over at least one physical link 134. In operation 528, each CPE 122/130 and each POP 120/126 may be utilized to define a policy 146 of at least one logical channel 144. In operation 530, each CPE 122/130 and each POP 120/126 may be utilized to transmit at least one packet 140 over a particular segment (e.g., first segment 124, second segment 126, and/or third segment 132) of the logical link 110 using a defined policy 148 of at least one logical channel 144, according to one embodiment.

Figure 6:
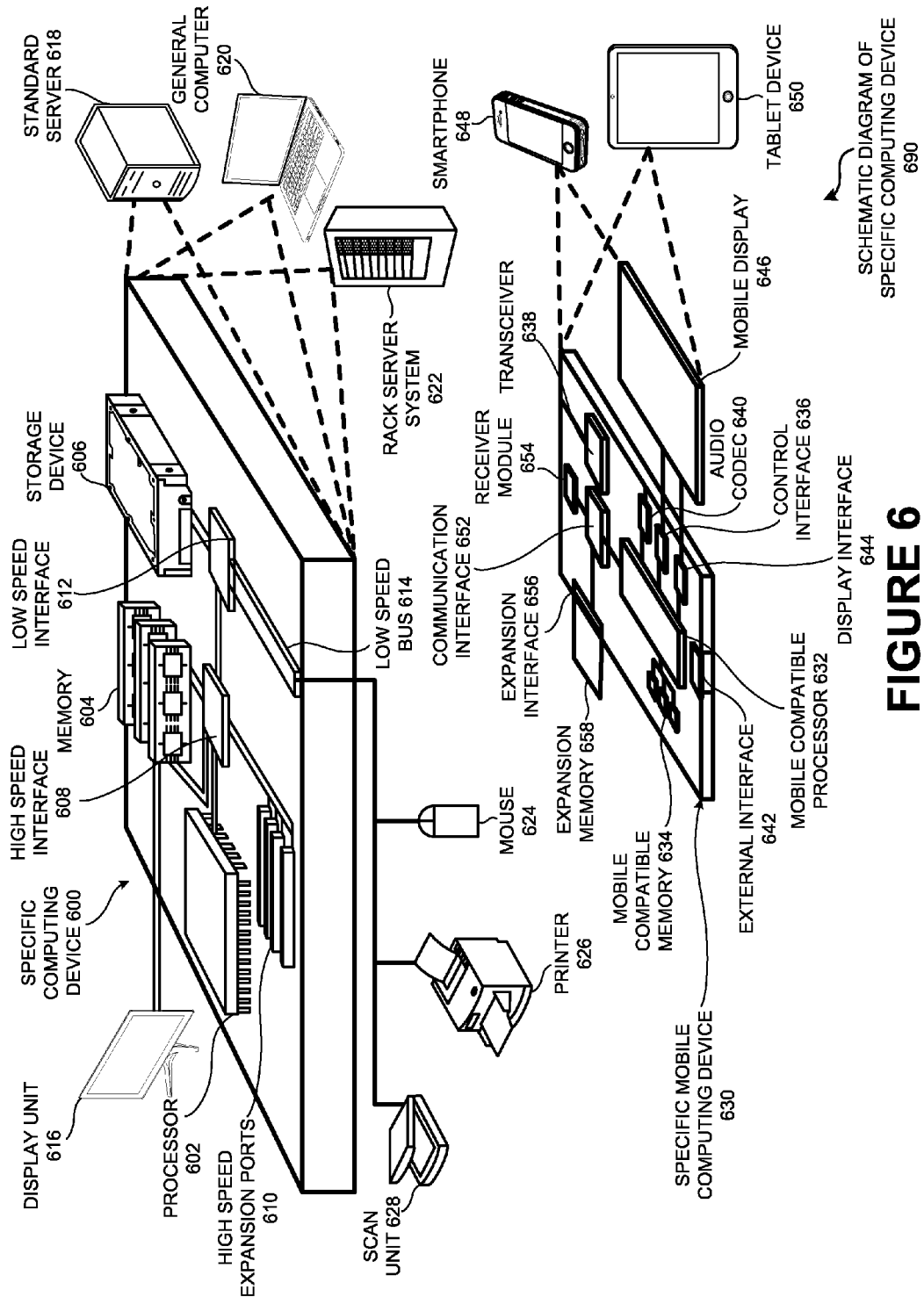
FIG. 6 is a schematic diagram of specific computing devices that can be used to implement the methods and systems, according to one embodiment.

FIG. 6 is a schematic diagram 690 of the specific computing devices 600 and a specific mobile computing device 630 that can be used to perform and/or implement any of the embodiments disclosed herein. In one or more embodiments, computer server (e.g., headquarters server 108 of FIG. 1) and/or user device may be the specific computing devices 600.

The specific computing devices 600 may represent various forms of digital computers, such as laptops, desktops, workstations, personal digital assistants, servers, blade servers, mainframes, and/or other appropriate computers. The specific mobile computing device 630 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The specific computing devices 600 may include a processor 602, a memory 604, a storage device 606, a high speed interface 608 coupled to the memory 604 and a plurality of high speed expansion ports 610, and a low speed interface 612 coupled to a low speed bus 614 and a storage device 606. In one embodiment, each of the components heretofore may be inter-coupled using various buses, and may be mounted on a common motherboard and/or in other manners as appropriate.

The processor 602 may process instructions for execution in the specific computing devices 600, including instructions stored in the memory 604 and/or on the storage device 606 to display a graphical information for a GUI on an external input/output device, such as a display unit 616 coupled to the high speed interface 608. In other embodiments, multiple processor(s) 602 and/or multiple buses may be used, as appropriate, along with multiple memories and/or types of memory 604. Also, a plurality of specific computing devices 600 may be coupled with, with each device providing portions of the necessary operations (e.g., as a server bank, a group of blade servers, and/or a multi-processor system).

The memory 604 may be coupled to the specific computing devices 600. In one embodiment, the memory 604 may be a volatile memory. In another embodiment, the memory 604 may be a non-volatile memory. The memory 604 may also be another form of computer-readable medium, such as a magnetic and/or an optical disk. The storage device 606 may be capable of providing mass storage for the specific computing devices 600. In one embodiment, the storage device 606 may be included of a floppy disk device, a hard disk device, an optical disk device, a tape device, a flash memory and/or other similar solid state memory device. In another embodiment, the storage device 606 may be an array of the devices in a computer-readable medium previously mentioned heretofore, computer-readable medium, such as, and/or an array of devices, including devices in a storage area network and/or other configurations.

A computer program may be included of instructions that, when executed, perform one or more methods, such as those described above. The instructions may be stored in the memory 604, the storage device 606, a memory 604 coupled to the processor 602, and/or a propagated signal.

The high speed interface 608 may manage bandwidth-intensive operations for the specific computing devices 600, while the low speed interface 612 may manage lower bandwidth-intensive operations. Such allocation of functions is exemplary only. In one embodiment, the high speed interface 608 may be coupled to the memory 604, the display unit 616 (e.g., through a graphics processor and/or an accelerator), and to the plurality of high speed expansion ports 610, which may accept various expansion cards.

In the embodiment, the low speed interface 612 may be coupled to the storage device 606 and the low speed bus 614. The low speed bus 614 may be included of a wired and/or wireless communication port (e.g., a Universal Serial Bus ("USB"), a Bluetooth® port, an Ethernet port, and/or a wireless Ethernet port). The low speed bus 614 may also be coupled to scan unit 628, a printer 626, a keyboard, a mouse 624, and a networking device (e.g., a switch and/or a router) through a network adapter.

The specific computing devices 600 may be implemented in a number of different forms, as shown in the Figure. In one embodiment, the specific computing devices 600 may be implemented as a standard server 618 and/or a group of such servers. In another embodiment, the specific computing devices 600 may be implemented as part of a rack server system 622. In yet another embodiment, the specific computing devices 600 may be implemented as a general computer 620 such as a laptop and/or desktop computer. Alternatively, a component from the specific computing devices

600 may be combined with another component in a specific mobile computing device 630.

In one or more embodiments, an entire system may be made up of a plurality of specific computing devices 600 and/or a plurality of specific computing devices 600 coupled to a plurality of specific mobile computing device 630. In one embodiment, the specific mobile computing device 630 may include a mobile compatible processor 632, a mobile compatible memory 634, and an input/output device such as a mobile display 646, a communication interface 652, and a transceiver 638, among other components. The specific mobile computing device 630 may also be provided with a storage device, such as a Microdrive and/or other device, to provide additional storage. In one embodiment, the components indicated heretofore are inter-coupled using various buses, and several of the components may be mounted on a common motherboard.

The mobile compatible processor 632 may execute instructions in the specific mobile computing device 630, including instructions stored in the mobile compatible memory 634. The mobile compatible processor 632 may be implemented as a chipset of chips that include separate and multiple analog and digital processors. The mobile compatible processor 632 may provide, for example, for coordination of the other components of the specific mobile computing device 630, such as control of user interfaces, applications run by the specific mobile computing device 630, and wireless communication by the specific mobile computing device 630.

The mobile compatible processor 632 may communicate with a user through the control interface 636 and the display interface 644 coupled to a mobile display 646. In one embodiment, the mobile display 646 may be a Thin-Film-Transistor Liquid Crystal Display ("TFT LCD"), an Organic Light Emitting Diode ("OLED") display, and another appropriate display technology. The display interface 644 may include appropriate circuitry for driving the mobile display 646 to present graphical and other information to a user. The control interface 636 may receive commands from a user and convert them for submission to the mobile compatible processor 632. In addition, an external interface 642 may be provided in communication with the mobile compatible processor 632, so as to enable near area communication of the specific mobile computing device 630 with other devices. External interface 642 may provide, for example, for wired communication in some embodiments, and/or for wireless communication in other embodiments, and multiple interfaces may also be used.

The mobile compatible memory 634 may be coupled to the specific mobile computing device 630. The mobile compatible memory 634 may be implemented as a volatile memory and a non-volatile memory. The expansion memory 658 may also be coupled to the specific mobile computing device 630 through the expansion interface 656, which may include, for example, a Single In Line Memory Module ("SIMM") card interface. The expansion memory 658 may provide extra storage space for the specific mobile computing device 630, and/or may also store an application and/or other information for the specific mobile computing device 630. Specifically, the expansion memory 658 may include instructions to carry out the processes described above. The expansion memory 658 may also include secure information. For example, the expansion memory 658 may be provided as a security module for the specific mobile computing device 630, and may be programmed with instructions that permit secure use of the specific mobile computing device 630. In addition, a secure application may be provided on the SIMM card, along with additional information, such as placing identifying information on the SIMM card in a non-hackable manner.

The mobile compatible memory 634 may include a volatile memory (e.g., a flash memory) and a non-volatile memory (e.g., a non-volatile random-access memory ("NVRAM")). In one embodiment, a computer program includes a set of instructions that, when executed, perform one or more methods. The set of instructions may be stored on the mobile compatible memory 634, the expansion memory 658, a memory coupled to the mobile compatible processor 632, and a propagated signal that may be received, for example, over the transceiver 638 and/or the external interface 642.

The specific mobile computing device 630 may communicate wirelessly through the communication interface 652, which may be included of a digital signal processing circuitry. The communication interface 652 may provide for communications using various modes and/or protocols, such as: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the transceiver 638 (e.g., radio-frequency transceiver). In addition, short-range communication may occur, such as using a Bluetooth®, Wi-Fi, and/or other such transceiver. In addition, a GPS ("Global Positioning System") receiver module may provide additional navigation-related and location-related wireless data to the specific mobile computing device 630, which may be used as appropriate by a software application running on the specific mobile computing device 630.

The specific mobile computing device 630 may also communicate audibly using an audio codec 640, which may receive spoken information from a user and convert it to usable digital information. The audio codec 640 may likewise generate audible sound for a user, such as through a speaker (e.g., in a handset of the specific mobile computing device 630). Such a sound may include a sound from a voice telephone call, a recorded sound (e.g., a voice message, a music files, etc.) and may also include a sound generated by an application operating on the specific mobile computing device 630.

The specific mobile computing device 630 may be implemented in a number of different forms, as shown in the Figure. In one embodiment, the specific mobile computing device 630 may be implemented as a smartphone 648. In another embodiment, the specific mobile computing device 630 may be implemented as a personal digital assistant ("PDA"). In yet another embodiment, the mobile device (e.g., specific mobile computing device 630) may be implemented as a tablet device.

An example embodiment will now be described. ANS may be a global pharmaceutical company whose headquarters are situated in Florida and may have three branches located in India, China, and Australia. ANS Company with multiple offices may have to make sure all the branches are linked as efficiently as possible. The headquarters office of ANS company in Florida and the branch offices may have to frequently communicate the data related to the annual and/or monthly sales of the drugs, share the records of the various drugs, and/or ensure the availability of essential drugs.

However, the communication between the headquarters of ANS Company and the branch offices may face critical issues e.g., speed of data transfer, congestion, distance, size of link, etc. In addition, the bandwidth and server performance may be reduced and may deliver poor quality of service to the branch offices. Furthermore, headquarters of the ANS Company and the branch offices may not be able to share the real-time reports. Also, the network connection between headquarters of ANS Company and the branch offices may delay queuing information and loss packet data.

Thanks to the various embodiments described in FIGS. 1-6 that may overcome aforementioned complexities. The network of service providers and the physical links connecting the headquarters and the branch offices of ANS pharmaceutical company may be optimized to handle the bottleneck in speed of data transfer. As a result, the delay in the data transfer between the headquarters and the branch offices may be mitigated. In addition, the loss of packets during the transmission of data may be reduced thereby improving the quality of the transferred data. By employing the various methods and/or system described in the FIG. 1-6, ANS Company may become a leading global healthcare company which uses technology and innovation to meet every day needs of all patients.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, an input device, and/or an output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well. For example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and/or a wide area network ("WAN") (e.g., the Internet). The computing system can include a client and/or a server. In one embodiment, the client and/or the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems and methods disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A system comprising:

a branch site including a branch client;

a headquarters site including a headquarters server, the branch site and the headquarters site being communicatively coupled over a logical link via a transmission media, the logical link being identified through a logical link identifier, the branch client and the headquarters server being communicatively coupled over a network connection via the transmission media, and the network connection being identified through a connection identifier;

a first point of presence (POP) communicatively coupled with a branch customer premise equipment (CPE) located at the branch site over a first segment of the logical link; and a second POP communicatively coupled with the first POP over a second segment of the logical link and communicatively coupled with a headquarters CPE located at the headquarters site over a third segment of the logical link;

each segment of the logical link being constructed from an at least one physical link and containing two segment endpoints;

the at least one physical link carrying a network traffic of the network connection between the two segment endpoints of an associated segment;

each POP being configured to:
  select a delivery optimization operation to perform on an at least one packet of the network connection based on a POP identifier, the logical link identifier, and the connection identifier, the at least one packet encoding the logical link identifier and the connection identifier, and
  perform the delivery optimization operation on the at least one packet based on that identification, and each CPE and each POP being configured to:
  define at least one logical channel to transmit the at least one packet over the at least one physical link,
  define a policy of at least one logical channel,
    wherein the policy is at least two of a path selection policy, a load balancing policy, a replication policy, and a timed replay policy,
    wherein the path selection policy selects a particular physical link to transmit the at least one packet from a first segment endpoint of the associated segment of the logical link to at least one of an associated POP and an associated CPE located at a second segment endpoint of the associated segment over the associated segment of the logical link based on a preferred path associated with at least one logical channel,
    wherein the load balancing policy selects the particular physical link to transmit the at least one packet from the first segment endpoint of the associated segment to at least one of the associated POP and the associated CPE located at the second segment endpoint of the associated segment over the associated segment of the logical link based on a round robin algorithm,
    wherein the replication policy selects at least two physical links over which to simultaneously transmit the at least one packet and at least one copy of the at least one packet over the associated segment of the logical link, and
    wherein the timed replay policy selects the at least one physical link over which to transmit the at least one packet and schedule a transmission of at least one copy of the at least one packet within a predefined time of transmitting the at least one packet over the at least one physical link, and
  transmit the at least one packet over the associated segment of the logical link using a defined policy of the at least one logical channel,
    wherein the at least one packet is securely transmitted between the branch site and the headquarters site over each segment of the logical link through at least one network tunnel,
    wherein the at least one network tunnel is generated using a tunneling protocol capable of encapsulating a payload protocol by a network protocol across at least one intervening firewall, and
    wherein each POP is located such that an application acceleration and a network optimization in the transmission of the at least one packet are dispersed across the system, without being concentrated at the end points thereof.

2. The system of claim 1:
wherein the at least one packet to be transmitted is encapsulated with at least one channel header,
  wherein the at least one channel header contains at least one of a channel identifier, a channel sequence number of the at least one packet, and a fragment identifier,
  wherein the at least one logical channel is encapsulated as a User Datagram Protocol (UDP) frame, and
  wherein a UDP frame is used by at least one of the first POP, the second POP, the branch CPE and the headquarters CPE receiving the at least one packet to identify the particular physical link on which the at least one packet was transmitted.

3. The system of claim 2, wherein each CPE and each POP is further configured to:
  receive the at least one packet,
  extract the at least one channel header from the at least one packet, and
  perform at least one of a packet loss recovery, a packet reordering, a TX-packing, and a packet fragment coalescence based on an information defined by the at least one channel header.

4. The system of claim 2, further comprising:
  at least one of the first POP and the second POP matching an information defined by the at least one channel header against a list of channel selectors to select a particular logical channel over which to transmit a packet,
  wherein a channel selector is at least one of a source subnet, a destination subnet, a Quality of Service (QoS) marking, a protocol, a source port, and a destination port.

5. The system of claim 2, wherein each CPE and each POP is further configured to:
  define a virtual maximum transmission unit (MTU) associated with the at least one logical channel,
    wherein a virtual MTU is higher than a physical MTU associated with the at least one physical link enabling transmission of the at least one packet when the at least one packet is larger than the physical MTU.

6. The system of claim 1, wherein the defined policy is the timed replay policy and at least one of the path selection policy, the load balancing policy, and the replication policy.

7. The system of claim 1, wherein the defined policy differs in at least two segments of the logical link.

8. The system of claim 1, wherein each CPE and each POP is further configured to define a QoS associated with the at least one logical channel.

9. The system of claim 1, wherein each CPE and each POP is further configured to:
  identify at least one of a channel metric and a physical link metric,
    wherein the channel metric is at least one of a channel loss, a channel round-trip time (RTT), a channel jitter, and a channel reorder, and
    wherein the physical link metric is at least one of a physical link loss, a physical link RTT, a physical link jitter, and a physical link reorder, and
  adjust a policy behavior associated with the defined policy based on an identified metric.

10. A system comprising:
  a branch site including a branch client;
  a headquarters site including a headquarters server, the branch site and the headquarters site being communicatively coupled over a logical link via a transmission media, the logical link being identified through a logical link identifier, the branch client and the headquarters server being communicatively coupled over a network connection via the transmission media, and the network connection being identified through a connection identifier;

a first point of presence (POP) communicatively coupled with a branch customer premise equipment (CPE) located at the branch site over a first segment of the logical link; and a second POP communicatively coupled with the first POP over a second segment of the logical link and communicatively coupled with a headquarters CPE located at the headquarters site over a third segment of the logical link;

each segment of the logical link being constructed from an at least one physical link and containing two segment endpoints;

the at least one physical link carrying a network traffic of the network connection between the two segment endpoints of an associated segment;

each POP being configured to:
  select a delivery optimization operation to perform on an at least one packet of the network connection based on a POP identifier, the logical link identifier, and the connection identifier, the at least one packet encoding the logical link identifier and the connection identifier, and
  perform the delivery optimization operation on the at least one packet based on that identification, and each CPE and each POP being configured to:
  define at least one logical channel to transmit the at least one packet over the at least one physical link,
  define a policy of at least one logical channel,
    wherein the policy is at least two of a path selection policy, a load balancing policy, a replication policy, and a timed replay policy,
    wherein the path selection policy selects a particular physical link to transmit the at least one packet from a first segment endpoint of the associated segment of the logical link to at least one of an associated POP and an associated CPE located at a second segment endpoint of the associated segment over the associated segment of the logical link based on a preferred path associated with at least one logical channel,
    wherein the load balancing policy selects the particular physical link to transmit the at least one packet from the first segment endpoint of the associated segment to at least one of the associated POP and the associated CPE located at the second segment endpoint of the associated segment over the associated segment of the logical link based on a round robin algorithm,
    wherein the replication policy selects at least two physical links over which to simultaneously transmit the at least one packet and at least one copy of the at least one packet over the associated segment of the logical link, and
    wherein the timed replay policy selects the at least one physical link over which to transmit the at least one packet and schedule a transmission of at least one copy of the at least one packet within a predefined time of transmitting the at least one packet over the at least one physical link, and
  determine whether to forward the at least one packet to at least one of the associated POP and the associated CPE,
  forward the at least one packet to at least one of the associated POP and the associated CPE based on a determination of whether to forward the at least one packet using a defined policy of at least one logical channel,
    wherein the at least one packet is securely transmitted between the branch site and the headquarters site over each segment of the logical link through at least one network tunnel,
    wherein the at least one network tunnel is generated using a tunneling protocol configured to encapsulate a payload protocol by a network protocol across at least one intervening firewall, and
    wherein each POP is located such that an application acceleration and a network optimization in the transmission of the at least one packet are dispersed across the system, without being concentrated at the end points thereof.

11. The system of claim 10:
  wherein the at least one packet to be transmitted is encapsulated with at least one channel header,
  wherein the at least one channel header contains at least one of a channel identifier, a channel sequence number of the at least one packet, and a fragment identifier,
  wherein the at least one logical channel is encapsulated as a User Datagram Protocol (UDP) frame, and
  wherein a UDP frame is used by at least one of the first POP, the second POP, the branch CPE and the headquarters CPE receiving the at least one packet to identify the particular physical link on which the at least one packet was transmitted.

12. The system of claim 11, wherein each CPE and each POP is further configured to:
  receive the at least one packet,
  extract the at least one channel header from the at least one packet, and
  perform at least one of a packet loss recovery, a packet reordering, a TX-packing, and a packet fragment coalescence based on an information defined by the at least one channel header.

13. The system of claim 11, further comprising:
  at least one of the first POP and the second POP matching an information defined by the at least one channel header against a list of channel selectors to select a particular logical channel over which to transmit a packet,
  wherein a channel selector is at least one of a source subnet, a destination subnet, a Quality of Service (QoS) marking, a protocol, a source port, and a destination port.

14. The system of claim 11, wherein each CPE and each POP is further configured to:
  define a virtual maximum transmission unit (MTU) associated with the at least one logical channel,
  wherein a virtual MTU is higher than a physical MTU associated with the at least one physical link enabling transmission of the at least one packet when the at least one packet is larger than the physical MTU.

15. The system of claim 10, wherein the defined policy is the timed replay policy and at least one of the path selection policy, the load balancing policy, and the replication policy.

16. The system of claim 10, wherein the defined policy differs in at least two segments of the logical link.

17. The system of claim 10, wherein each CPE and each POP is further capable of defining a QoS associated with the at least one logical channel.

18. The system of claim 10, wherein each CPE and each POP is further configured to:

identify at least one of a channel metric and a physical link metric,
  wherein the channel metric is at least one of a channel loss, a channel round-trip time (RTT), a channel jitter, and a channel reorder, and
  wherein the physical link metric is at least one of a physical link loss, a physical link RTT, a physical link jitter, and a physical link reorder, and
adjust a policy behavior associated with the defined policy based on an identified metric.

19. A method comprising:
securely transmitting an at least one packet between a branch site including a branch client and a headquarters site including a headquarters server over each of a first segment, a second segment, and a third segment of a logical link through at least one network tunnel created using a tunneling protocol configured to encapsulate a payload protocol by a network protocol across at least one intervening firewall, the branch site and the headquarters site being communicatively coupled over the logical link via a transmission media, the logical link being identified through a logical link identifier, the branch client and the headquarters server being communicatively coupled over a network connection via the transmission media, and the network connection being identified through a connection identifier;
implementing a first point of presence (POP) communicatively coupled with a branch customer premise equipment (CPE) located at the branch site over the first segment of the logical link;
implementing a second POP communicatively coupled to the first POP over the second segment of the logical link, and communicatively coupled with a headquarters CPE located at the headquarters site over the third segment of the logical link;
constructing each segment of the logical link from an at least one physical link, wherein each segment contains two segment endpoints;
carrying a network traffic of the network connection by the at least one physical link between the two segment endpoints of an associated segment;
utilizing each POP to:
  select a delivery optimization operation to perform on the at least one packet of the network connection based on a POP identifier, the logical link identifier, and the connection identifier, the at least one packet encoding the logical link identifier and the connection identifier, and
  perform the delivery optimization operation on the at least one packet based on that identification, and
utilizing each CPE and each POP to:
  define at least one logical channel to transmit the at least one packet over the at least one physical link,
  define a policy of at least one logical channel,
    wherein the policy is at least two of a path selection policy, a load balancing policy, a replication policy, and a timed replay policy,
    wherein the path selection policy selects a particular physical link to transmit the at least one packet from a first segment endpoint of the associated segment of the logical link to at least one of an associated POP and an associated CPE located at a second segment endpoint of the associated segment over the associated segment of the logical link based on a preferred path associated with the at least one logical channel,
    wherein the load balancing policy selects the particular physical link to transmit the at least one packet from the first segment endpoint of the associated segment to at least one of the associated POP and the associated CPE located at the second segment endpoint of the associated segment over the associated segment of the logical link based on a round robin algorithm,
    wherein the replication policy selects at least two physical links over which to simultaneously transmit the at least one packet and at least one copy of the at least one packet over the associated segment of the logical link, and
    wherein the timed replay policy selects the at least one physical link over which to transmit the at least one packet and schedule a transmission of at least one copy of the at least one packet within a predefined time of transmitting the at least one packet over the at least one physical link, and
  transmit the at least one packet over the associated segment of the logical link using a defined policy of the at least one logical channel,
    wherein the at least one packet is securely transmitted between the branch site and the headquarters site over each segment of the logical link through at least one network tunnel,
    wherein the at least one network tunnel is generated using the tunneling protocol capable of encapsulating the payload protocol by the network protocol across at least one intervening firewall, and
    wherein each POP is located such that an application acceleration and a network optimization in the transmission of the at least one packet are dispersed across a system, without being concentrated at the end points thereof.

20. The method of claim 19:
wherein the at least one packet to be transmitted is encapsulated with at least one channel header,
wherein the at least one channel header contains at least one of a channel identifier, a channel sequence number of the at least one packet, and a fragment identifier,
wherein the at least one logical channel is encapsulated as a User Datagram Protocol (UDP) frame,
wherein a UDP frame is used by at least one of the first POP, the second POP, the branch CPE and the headquarters CPE receiving the at least one packet to identify the particular physical link on which the at least one packet was transmitted, and
wherein each CPE and each POP is further utilized to:
  receive the at least one packet,
  extract the at least one channel header from the at least one packet, and
  perform at least one of a packet loss recovery, a packet reordering, a TX-packing, and a packet fragment coalescence based on an information defined by the at least one channel header.

21. The method of claim 20, wherein each CPE and each POP is further utilized to:
define a virtual maximum transmission unit (MTU) associated with the at least one logical channel,
  wherein a virtual MTU is higher than a physical MTU associated with the at least one physical link enabling transmission of the at least one packet when the at least one packet is larger than the physical MTU.

22. The method of claim 19, wherein the defined policy is the timed replay policy and at least one of the path selection policy, the load balancing policy, and the replication policy.

23. The method of claim 19, wherein the defined policy differs in at least two segments of the logical link.

\* \* \* \* \*